United States Patent [19]

Healy

[11] 4,370,092

[45] Jan. 25, 1983

[54] PARTS HANDLING MACHINE

[76] Inventor: Francis L. Healy, c/o Automatic Tool Co., P.O. Box 3146, 1233 Broadway Ct., Rockford, Ill. 61106

[21] Appl. No.: 189,893

[22] Filed: Sep. 22, 1980

[51] Int. Cl.$^3$ .............................................. B66C 23/00
[52] U.S. Cl. ...................................... 414/752; 74/961; 414/121
[58] Field of Search ............... 414/589, 222, 749, 751, 414/752, 121; 74/96, 89.21, 53, 54, 57

[56] References Cited

U.S. PATENT DOCUMENTS 3,146,973 9/1964 Haase ................................. 74/96 X
3,865,253 2/1975 Healy ............................. 414/751 X

OTHER PUBLICATIONS

Stelron Translator brochure "Building Blocks for Automation".

Primary Examiner—John J. Love
Assistant Examiner—Douglas D. Watts
Attorney, Agent, or Firm—Leydig, Voit, Osann, Mayer & Holt, Ltd.

[57] ABSTRACT

A machine in which a mechanism picks up, transfers and releases a part. The pick up mechanism is supported on a coordinately movable carriage which is supported by two additional carriages adapted to reciprocate along mutually perpendicular paths. The two latter carriages are reciprocated by oscillating arms connected to rotary cams by endless drives which serve to amplify the motion of the cams to enable cams with relatively small pressure angles to oscillate the arms at relatively high speeds and through relatively long strokes.

9 Claims, 5 Drawing Figures

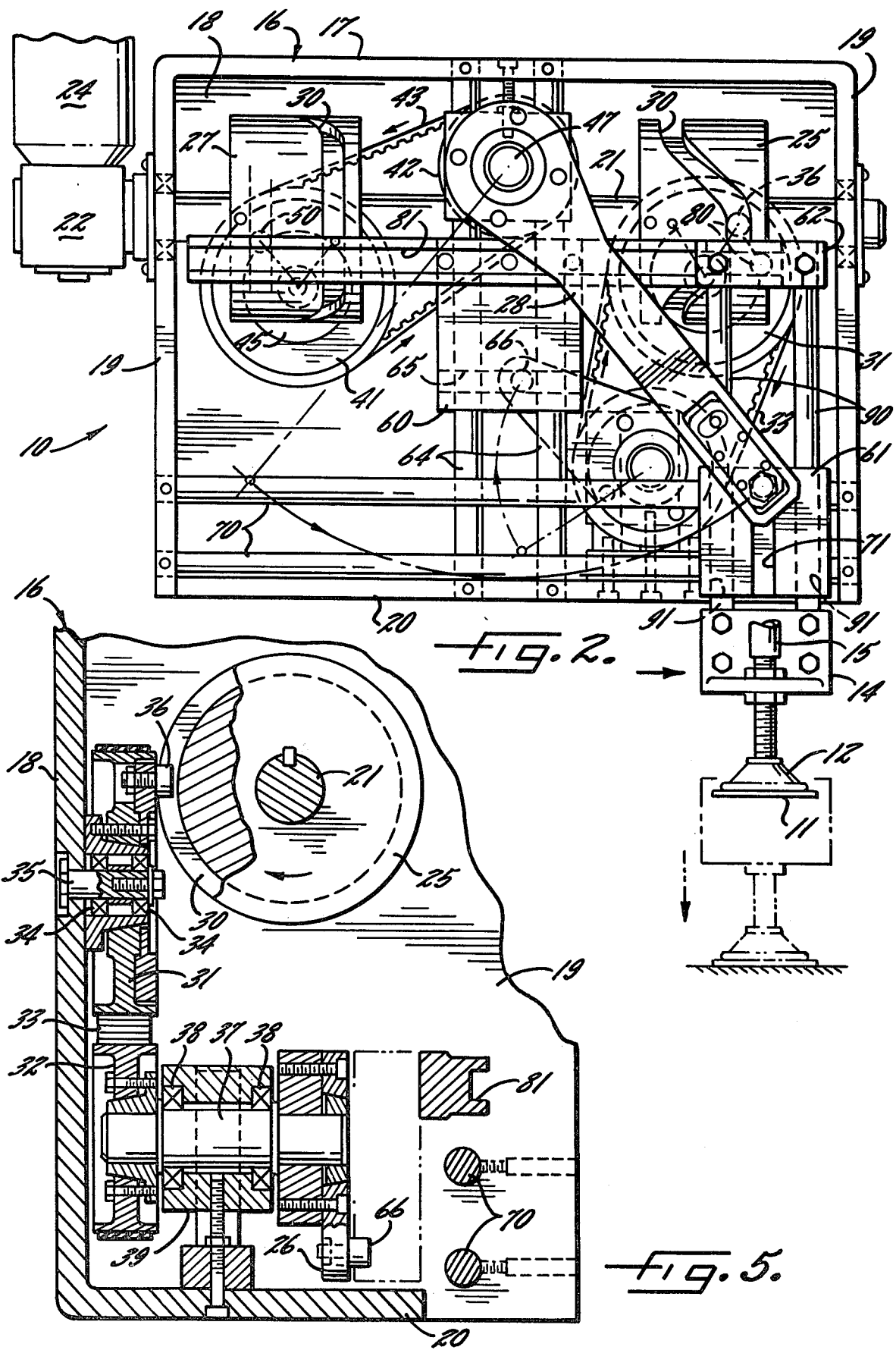

PARTS HANDLING MACHINE

BACKGROUND OF THE INVENTION

This invention relates to a machine for handling parts and, more particularly, to a machine for picking up a part at one position and for transferring the part to and placing the part in a second position.

A machine of this general type is disclosed in Healy U.S. Pat. No. 3,865,253. Such machines usually comprise two carriages with one of the carriages being guided for reciprocating movement along a linear path. The other carriage is mounted to move with the first carriage along the first path and also is mounted to reciprocate relative to the first carriage along a substantially perpendicular path. Selectively operable mechanism for picking up and releasing a part is mounted on the second carriage and can be traversed along different coordinates by moving the carriages.

The carriages are reciprocated by power-rotated cams whose rotary motion is converted to reciprocating motion by oscillating arms connected between the cams and the carriages. The arms serve to amplify the motion of the cams and enable cams with relatively small pressure angles to move the carriages through relatively long strokes. By keeping the pressure angles of the cams small, the cams can be rotated at relatively high speeds to produce high speed movement of the carriages.

SUMMARY OF THE INVENTION

One of the general aims of the present invention is to provide a new and improved parts handling machine in which the motion of the cams is amplified still further so as to enable cams having a given pressure angle and arms having a given length to reciprocate the carriages through a longer stroke and at higher speeds.

A more detailed object is to achieve the foregoing by transmitting the motion of the cams to the arms by way of endless drives which are capable of oscillating the arms through a longer stroke and at higher speeds when cams having given pressure angles are rotated at a given speed.

Another aim of the invention is to provide a parts handling machine in which the carriages are disposed within a relatively compact housing and in which the pick up mechanism is adapted to be moved through a comparatively long stroke without parts of one of the carriages projecting dangerously out of the housing during such movement.

Still another object is to achieve the foregoing by uniquely mounting the second carriage on the first carriage by means of a third carriage which enables the second carriage and the pick up mechanism to move coordinately while enabling the first carriage to remain completely within the housing.

These and other objects and advantages of the invention will become more apparent from the following detailed description when taken in conjunction with the accompanying drawings.

BRIEF DESCRIPTION OF THE DRAWINGS

FIG. 1 is a fragmentary front elevational view of a new and improved parts handling machine incorporating the unique features of the present invention.

FIG. 2 is a view similar to FIG. 1 but shows certain parts of the machine in moved positions.

FIGS. 3, 4 and 5 are enlarged fragmentary crosssectional views taken substantially along the lines 3—3, 4—4, and 5—5, respectively, of FIG. 1.

DETAILED DESCRIPTION OF THE PREFERRED EMBODIMENT

Figures 1, 4:
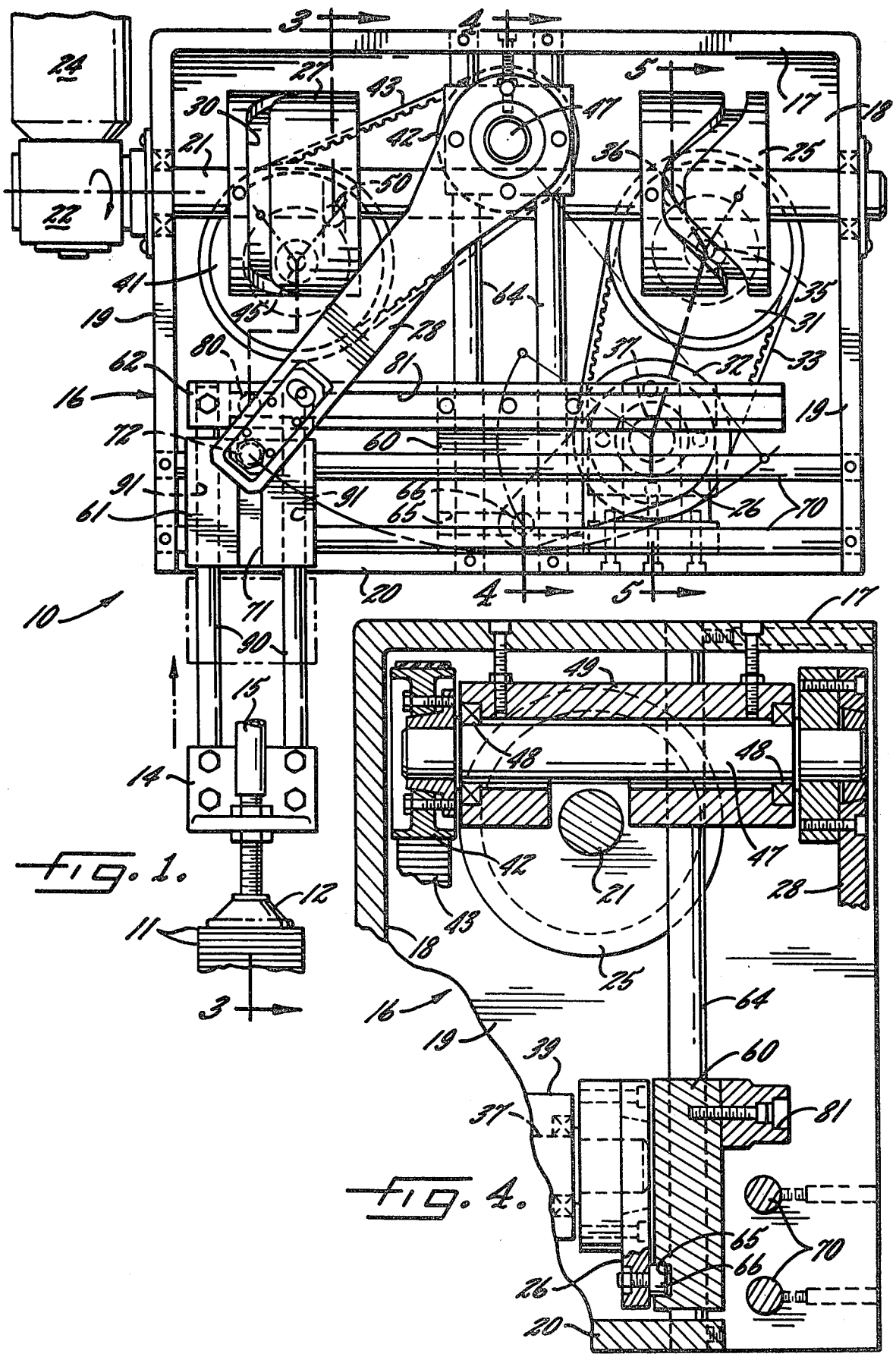

As shown in the drawings for purposes of illustration, the invention is embodied in a machine 10 for picking up a part 11 in one position, for transferring the part to a different position and for then releasing the part. In the present instance, a vacuum cup 12 is shown in the drawings as being used to pick up and transfer the part. The vacuum cup is supported by a mounting bracket 14 and is connected to a flexible line 15 which communicates with a vacuum pump (not shown).

As the cup 12 is moved vertically downwardly to the position shown in FIG. 1 and into engagement with the part 11, vacuum is applied to the line 15 to cause the cup to grip the part. Thereafter, the cup is shifted vertically upwardly to lift the part and then is shifted horizontally to the right to transfer the part to the position shown in full lines in FIG. 2. The cup then is shifted vertically downwardly to place the part in the position shown in broken lines in FIG. 2. Upon completion of the downward shifting, the vacuum in the line 15 is broken to cause the cup to release the part. Thereafter, the cup is sequentially moved vertically upwardly, horizontally to the left and vertically downwardly to pick up the next part.

The suction cup 12 and the mounting bracket 14 are located beneath a main support which herein is in the form of a boxlike housing 16 having a top wall 17, a back wall 18, opposing end walls 19 and a bottom wall 20, the bottom wall terminating short of the front of the housing. A horizontal shaft 21 is journaled for rotation by the end walls 19 and is connected at one end to a right angle gear box 22 (FIG. 1) supported on the outside of the left end wall and connected to an electric motor 24. When energized, the motor 24 rotates the shaft 21 to effect movement of the suction cup 12.

A barrel cam 25 is keyed to the shaft 21 and coacts with an oscillating arm 26 (FIGS. 2 and 5) to convert the rotary motion of the shaft into up and down movement of the suction cup 12. Another barrel cam 27 is secured to the shaft 21 in axially spaced relation from the cam 25 and coacts with an oscillating arm 28 (FIGS. 1 and 3) to cause the suction cup to move horizontally back and forth. Each cam is formed with an angled cam track 30 which causes the respective arm to oscillate as the cam is rotated. The arms 26 and 28 amplify the motions of the cams 25 and 27 and cause the cup 12 to move through relatively long vertical and horizontal strokes even though the pressure angles of the cam tracks 30 are comparatively small. By keeping the pressure angles small, the shaft 21 can be rotated at comparatively high speeds to effect high speed movement of the suction cup.

In accordance with one aspect of the present invention, the motions of the cams 25 and 27 are amplified over and above the amplification effected by the arms 26 and 28 by uniquely connecting the cams to the arms by means of endless drives. As a result of the amplification effected by the endless drives, cams which are rotated at a high speed and which have tracks 30 with low pressure angles can oscillate the arms at faster speeds and through longer strokes. This in turn produces faster movement of the suction cup 12 through strokes of greater length.

More specifically, the cam 25 is connected to the arm 26 by a large toothed wheel or pulley 31 (FIGS. 1 and 5), by a smaller toothed wheel or pulley 32 and by an endless drive or belt 33 which is trained around the two pulleys. As shown in FIG. 5, the large pulley 31 is journaled for rotation by bearings 34 which are supported by a stationary horizontal stub shaft 35 secured to and projecting from the rear wall 18 of the housing 16. Carried on the forward side of the large pulley 31 is a roller follower 36 which projects into the track 30 of the cam 25. As the cam 25 rotates, the follower 36 causes the pulley 31 to turn back and forth on the bearings 34.

The pulley 32 has a diameter which is smaller than that of the pulley 31 and is fastened rigidly to the rear end portion of a shaft 37 (FIG. 5). The shaft 37 is journaled for rotation by bearings 38 supported in a block 39 which, in turn, is anchored to the bottom wall 20 of the housing 16. At its forward end, the shaft 37 is secured rigidly to one end portion of the arm 26.

The endless belt 33 is similar to an elastomeric timing belt and is formed with teeth or cogs on its inner side. The belt is trained around and is tensioned between the two pulleys 31 and 32 and serves to transmit the motion of the pulley 31 to the pulley 32 in a relatively quiet manner.

Because the pulley 32 is smaller than the pulley 31, the pulley 32 turns faster than the pulley 31 when the latter is turned back and forth by the cam 25. Also, the pulley 32 turns through a greater angular distance than the pulley 31. As a result, the arm 26 is oscillated at comparatively high speed and through a comparatively large angle.

Figure 3:
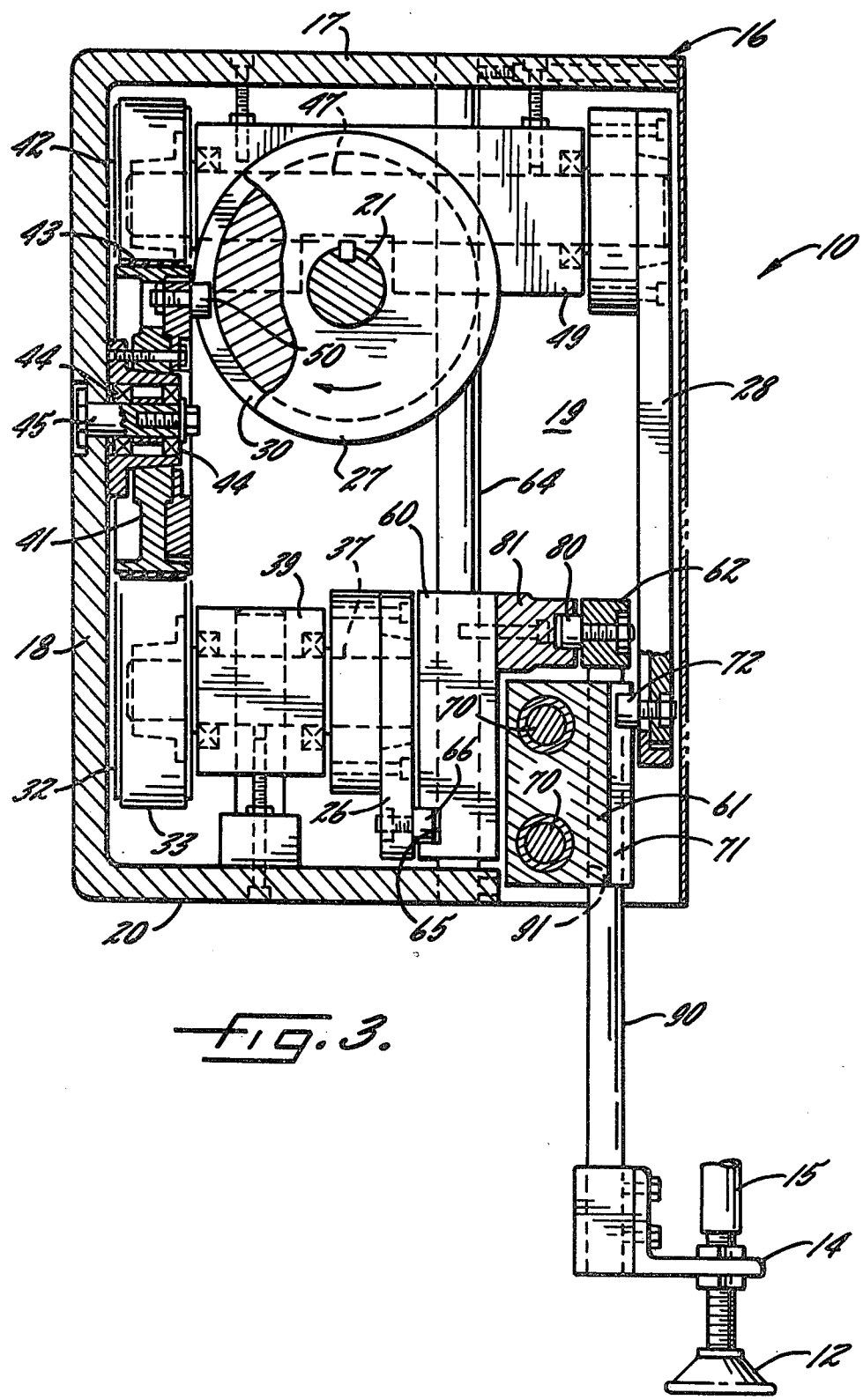

The arm 28 is oscillated in a manner similar to the arm 26, the oscillation of the arm 28 being effected by a large toothed wheel or pulley 41 (FIGS. 1 and 3), a small toothed wheel or pulley 42 and an endless drive or belt 43. As shown in FIG. 3, the large pulley 41 is journaled on bearings 44 which are supported by a stationary stub shaft 45 projecting forwardly from and secured to the rear wall 18 of the housing 16. The small pulley 42 has a diameter which is approximately one-half that of the large pulley 41 and is secured rigidly to the rear end portion of a shaft 47 (FIG. 4) which extends parallel to the stub shaft 45. Bearings 48 journal the shaft 47 for rotation and are supported within a bearing block 49 which is suspended from the top wall 17 of the housing 16. The upper end portion of the arm 28 is secured rigidly to the forward end of the shaft 47 as shown in FIG. 4.

Carried on the forward side of the large pulley 41 is a roller follower 50 (FIG. 3) which projects into the track 30 of the cam 27. Accordingly, rotation of the cam 27 produces back and forth turning of the large pulley 41. The belt 43 is similar to the belt 33 and is trained around and tensioned between the two pulleys 41 and 42 to cause the pulley 41 to effect back and forth turning of the pulley 42, the shaft 47 and the arm 28. Because of the difference in the diameters of the pulleys 41 and 42, the small pulley 42 is oscillated at a higher speed and through a greater angular distance then the large pulley 41. This produces high speed oscillation of the arm 28 through a comparatively large angular distance to effect high speed movement of the suction cup 12 through a long stroke.

According to another aspect of the invention, three carriages 60, 61 and 62 (FIG. 3) are uniquely employed to cause up and down vertical movement and back and forth horizontal movement of the pick up mechanism of suction cup 12. By utilizing three carriages rather than two carriages as customarily is the case, the housing 16 may be made relatively compact, the suction cup and one of the carriages may be reciprocated through a relatively long stroke and yet parts of that carriage will not project dangerously out of the housing during such reciprocation.

The carriage 60 is in the form of a block which is supported for up and down movement on a pair of horizontally spaced guides or rods 64 extending vertically between and secured to the top and bottom walls 17 and 20 of the housing 16. A horizontal track or slot 65 (FIG. 4) is formed in the rear side of the carriage 60 and receives a roller 66 which is supported on the free end of the arm 26. As the arm 26 is oscillated, the roller 66 bears against the top and bottom sides of the slot 65 to shift the carriage 60 upwardly and downwardly on the guide rods 64. At the same time, the roller 66 rides horizontally along the slot 65 to permit the arm 26 to oscillate while the carriage 60 is being reciprocated.

The carriage 61 also is in the form of a block which is supported for back and forth horizontal movement on a pair of vertically spaced guides or rods 70 extending horizontally between and secured to the two end walls 19 of the housing 16. A vertical track or slot 71 (FIG. 3) is formed in the forward side of the carriage 61 and receives a roller 72 which is supported on the free end of the arm 28. As the arm 28 is oscillated, the roller 72 bears against the right and left sides of the slot 71 to shift the carriage 61 horizontally back and forth along the guide rods 70. At the same time, the roller 72 rides vertically within the slot 71 to permit the arm 28 to oscillate while the carriage 61 is being reciprocated.

In carrying out the invention, the suction cup 12 is mounted to move up and down and back and forth with the third carriage 62. The third carriage 62 is mounted to move up and down with the carriage 60 and to move horizontally back and forth relative to the carriage 60. In addition, the third carriage 62 is mounted to move horizontally back and forth with the carriage 61 and to move upwardly and downwardly relative to the carriage 61. By virtue of the arrangement of the three carriages, not a single moving part of the machine 10 projects horizontally out of the end walls 19 of the housing 16 when the suction cup 12 is moved horizontally back and forth. This reduces the danger of injury to the operator of the machine.

More specifically, the carriage 62 is in the form of a block whose rear side supports a roller 80 (FIG. 3). The roller 80 is received in a horizontal guide or slotted track 81 which is secured rigidly to the carriage 60 to move upwardly and downwardly with the carriage 60, the track 81 extending parallel to the guide rods 70. When the track 81 is shifted upwardly and downwardly with the carriage 60, the lower and upper sides of the track 81 bear against the roller 80 to shift the carriage 62 upwardly and downwardly. The roller 80 rides horizontally along the track 81 to permit the carriage 62 to shift horizontally relative to the carriage 60.

Two horizontally spaced and vertically extending rods 90 (FIGS. 1 and 3) are attached rigidly at their upper ends to the carriage 62 and form part of that carriage. The rods 90 are supported for up and down sliding by guides 91 which herein are in the form of bores extending vertically through the carriage 61 and disposed parallel to the guide rods 64. At their lower ends, the rods 90 are attached securely to the mounting bracket 14 for the suction cup 12 (see FIG. 3).

With the foregoing arrangement, clockwise swinging of the arm 26 from the position shown in FIG. 1 causes the roller 66 to act against the upper side of the slot 65 and lift the carriage 60 upwardly along the guide rods 64 without imparting any horizontal force component to the carriage 60. The track 81 moves upwardly with the carriage 60 and acts against the roller 80 to lift the carriage 62. As the carriage 62 is lifted, the rods 90 slide upwardly within the guide bores 91 in the carriage 61 and shift the suction cup 12 upwardly to lift the part 11.

When the arm 28 is subsequently swung in a counterclockwise direction from the position shown in FIG. 1, the roller 72 acts against the right side of the slot 71 to shift the carriage 61 to the right along the guide rods 70 without imparting any vertical force component to the carriage 61. As the carriage 61 is shifted to the right, the walls of the guide bores 91 in the carriage 61 act against the rods 90 to shift the rods 90, the suction cup 12 and the carriage 62 to the right and transfer the part 11 to the position shown in full lines in FIG. 2. As the carriage 62 is shifted to the right, the roller 80 rides along the track 81 to permit movement of the carriage 62.

When the suction cup 12 reaches the position shown in full lines in FIG. 2, the arm 26 is swung in a counterclockwise direction and acts through the rollers 66, the slot 65, the carriage 60, the track 81 and the roller 80 to shift the carriage 62, the suction cup 12 and the part 11 downwardly to the position shown in broken lines in FIG. 2. Thereafter, the arm 26 is swung reversely to lift the suction cup 12 and then the arm 28 is swung in a clockwise direction. As an incident thereto, the carriages 61 and 62 and the suction cup 12 are returned to the left preparatory to the cup being lowered to pick up another part.

From the foregoing, it will be apparent that the provision of the three carriages 60, 61 and 62 enables the suction cup 12 to move horizontally through a long stroke without any parts of the machine 10 projecting horizontally out of the end walls 19 of the housing 16. The operator thus may stand near either end of the machine without danger of being struck.

I claim:

1. A parts handling machine adapted to pick up, transfer and place a part, said machine comprising a support, first and second guides on said support and extending substantially perpendicular to one another, first and second carriages, means for moving said first and second carriages back and forth along said first and second guides, respectively, a third guide movable back and forth with said first carriage and extending substantially parallel to said second guide, a fourth guide movable back and forth with said second carriage and extending substantially parallel to said first guide, a third carriage, first means mounting said third carriage to move back and forth with said third guide along a first path extending parallel to said first guide and to move back and forth relative to said third guide along a second path extending parallel to said second guide, second means mounting said third carriage to move back and forth with said fourth guide along said second path and to move back and forth relative to said fourth guide along said first path, and means movable with said third carriage and selectively operable to pick up and release a part.

2. A parts handling machine as defined in claim 1 in which said first and second guides are fixed to said support, said third guide comprising a track, said first means comprising a roller rotatably mounted by said third carriage and disposed within said track, said track bearing against said roller to move said third carriage along said first path, and said roller rolling along said track to enable said third carriage to move along said second path.

3. A parts handling machine as defined in claim 2 in which said moving means comprise first and second oscillating arms, a roller rotatably supported by each of said arms, a track in said first carriage extending parallel to said second path and receiving the roller on said first arm, and a track in said second carriage extending parallel to said first path and receiving the roller on said second arm.

4. A parts handling machine as defined in claim 3 in which said moving means further comprise power-rotated shaft means mounted on said support, first and second cams rotatable with said shaft means, first and second pairs of wheels rotatably mounted on said support, one wheel of each pair being larger in diameter than the other wheel of the pair, means connecting the large wheel of each pair of the respective cams and operable to oscillate the large wheels in response to rotation of the cams, endless drives trained around the wheels of each pair and operable to transmit oscillation of the large wheel of each pair to the small wheel of the pair, said first and second arms being connected to and oscillating with the small wheels of said first and second pairs, respectively.

5. A parts handling machine as defined in claim 1 in which said moving means comprise power-rotated shaft means mounted on said support, first and second cams rotatable with said shaft means, first and second pairs of wheels rotatably mounted on said support, one wheel of each pair being larger in diameter than the other wheel of the pair, means connecting the large wheel of each pair to the respective cams and operable to oscillate the large wheels in response to rotation of the cams, endless drives trained around the wheels of each pair and operable to transmit oscillation of the large wheel of each pair to the small wheel of the pair, means connected between said first carriage and the small wheel of said first pair and operable to reciprocate said first carriage back and forth along said first guide in response to oscillation of such wheel, and means connected between said second carriage and the small wheel of said second pair and operable to reciprocate said second carriage back and forth along said second guide in response to oscillation of such wheel.

6. A parts handling machine adapted to pick up, transfer and place a part, said machine comprising a support, a first carriage mounted on said support to move back and forth along a first substantially linear path, a second carriage mounted on said first carriage to move with said first carriage and to move back and forth relative to said first carriage along a second substantially linear path extending substantially perpendicular to said first path, means on said second carriage and selectively operable to pick up and release a part, power-rotated shaft means mounted on said support, first and second cams rotatable with said shaft means, first and second pairs of wheels rotatably mounted on said support, one wheel of each pair being larger in diameter than the other wheel of the pair, means connecting the large wheel of each pair to the respective cams and operable to oscillate the large wheels in response to rotation of the cams, endless drives trained around the wheels of each pair and operable to transmit oscillation of the large wheel of each pair to the small wheel of the pair, means connected between said first carriage and the small wheel of said first pair and operable to reciprocate said first carriage back and forth along said first path in response to oscillation of such wheel, means connected between said second carriage and the small wheel of said second pair and operable to reciprocate said second carriage back and forth along said second path in response to oscillation of such wheel, said last-mentioned means comprising an arm connected to oscillate with the small wheel of the second pair, a third carriage, means connecting said arm to said third carriage and operable to reciprocate said third carriage back and forth along a path extending substantially parallel to said second path when said arm is oscillated, and means connecting said third carriage to said second carriage and operable to move said second carriage with said third carriage and to guide said second carriage for movement relative to said third carriage and along said first path.

7. A parts handling machine as defined in claim 6 in which said means for connecting said arm to said third carriage comprise a roller rotatably mounted on said arm, and a track in said third carriage extending parallel to said first path and receiving said roller.

8. A parts handling machine as defined in claim 7 in which said means for connecting said first carriage and the small wheel of said first pair comprise an additional arm connected to oscillate with the small wheel of the first pair, a roller rotatably mounted on said additional arm, and a track on said first carriage extending parallel to said second path and receiving the last-mentioned roller.

9. A parts handling machine as defined in claim 8 further including a roller on said second carriage, and an additional track on said first carriage extending parallel to said second path and receiving the last-mentioned roller.

* * * * *